US009485778B2

(12) United States Patent
Linde et al.

(10) Patent No.: US 9,485,778 B2
(45) Date of Patent: Nov. 1, 2016

(54) WIFI REAL-TIME STREAMING AND BLUETOOTH COEXISTENCE (71) Applicant: Apple Inc., Cupertino, CA (US)

(72) Inventors: Joakim Linde, Cupertino, CA (US); Aarti Kumar, San Jose, CA (US); Christiaan A. Hartman, Cupertino, CA (US); Pierre B. Vandwalle, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 14/167,538

(22) Filed: Jan. 29, 2014

(65) Prior Publication Data
US 2014/0219193 A1 Aug. 7, 2014

Related U.S. Application Data (60) Provisional application No. 61/759,870, filed on Feb. 1, 2013.

(51) Int. Cl.
H04W 72/04 (2009.01)
H04W 84/12 (2009.01)
(Continued)

(52) U.S. Cl.
CPC ......... *H04W 72/1215* (2013.01); *H04W 8/005* (2013.01); *H04W 88/06* (2013.01)

(58) Field of Classification Search
CPC ... H04W 84/12; H04W 80/04; H04W 72/04; H04W 88/08; H04W 76/00; H04W 72/0446; H04W 72/0453
See application file for complete search history.

(56) References Cited

U.S. PATENT DOCUMENTS 7,215,659 B1 5/2007 Chen et al.
2006/0155802 A1 7/2006 He et al.
(Continued)

FOREIGN PATENT DOCUMENTS

WO 2010/002219 A2 1/2010

OTHER PUBLICATIONS

Ye et al., "Adaptive Topology Optimization Base on Bidirectional Peer Selection in Peer-to-Peer Media Streaming,"Dept. of Electronic Engineering and Information Science, Univ. of Science and Technology of China, Communications and Networking in China, 2008, 5 pages.

(Continued)

Primary Examiner — Andrew Lee
(74) Attorney, Agent, or Firm — Sterne, Kessler, Goldstein & Fox P.L.L.C.

(57) ABSTRACT

A system and method for peer-to-peer communications is disclosed. A first wireless device receives a message from a second wireless device identifying communication requirements of a point-to-point communication involving the second wireless device. The first wireless device determines whether the second wireless device's communication requirements can be satisfied based on communication resources already committed for other communications. When the communication requirements of the second wireless device can be satisfied, the first wireless device generates a time sharing schedule to be used by the first and second wireless devices based on the already-committed communication requirements and the second device's communication requirements. The time sharing schedule may include a first portion for broadcast communication among a group of devices to which the first and second wireless devices belong, and a second portion for the point-to-point communications of the second wireless devices.

19 Claims, 8 Drawing Sheets (51) Int. Cl.
*H04W 72/12* (2009.01)
*H04W 88/06* (2009.01)
*H04W 8/00* (2009.01)

(56) References Cited

U.S. PATENT DOCUMENTS

| | | | |
|---|---|---|---|
| 2007/0224936 A1* | 9/2007 | Desai | 455/41.2 |
| 2007/0281743 A1 | 12/2007 | Palin et al. | |
| 2008/0279138 A1* | 11/2008 | Gonikberg et al. | 370/328 |
| 2009/0034498 A1 | 2/2009 | Banerjea et al. | |
| 2009/0290522 A1* | 11/2009 | Zhou | 370/312 |
| 2010/0137025 A1* | 6/2010 | Tal et al. | 455/553.1 |
| 2010/0177717 A1* | 7/2010 | Sung et al. | 370/329 |
| 2011/0130197 A1* | 6/2011 | Bytnar et al. | 463/25 |
| 2012/0136949 A1* | 5/2012 | Virani et al. | 709/206 |
| 2012/0253489 A1* | 10/2012 | Dugan | 700/91 |
| 2012/0276938 A1 | 11/2012 | Wagholikar et al. | |
| 2013/0124508 A1* | 5/2013 | Paris et al. | 707/723 |
| 2013/0155884 A1* | 6/2013 | Wang et al. | 370/252 |

OTHER PUBLICATIONS

Chokshi, "Yes! Wi-Fi and Bluetooth Can Coexist in Handheld Devices," Emerging and Embedded Business Unit, Marvell Semiconductor, Inc., Mar. 2010, pp. 1-9.

Yang et al., "Contention-Aware Admisson Control for Ad Hoc Netwoks," IEEE Transactons on Mobie Computing, Jul./Aug. 2005, vol. 4, No. 4, pp. 363-377.

Cui et al., "Optimizing P2P Streaming Throughput under Peer Churning," Department of Electrical Engineering and Computer Science, Vanderbilt University, Nashville, TN, IEEE GLOBECOM 2007 Proceedings, 5 pages.

International Search Report, mailed Apr. 23, 2014, from corresponding International Application No. PCT/US2014/013624 filed Jan. 29, 2014.

Taiwanese Office Action, issued May 28, 2015, from corresponding TW Patent Application No. 103103656, filed Jan. 29, 2014.

* cited by examiner

WIFI REAL-TIME STREAMING AND BLUETOOTH COEXISTENCE

RELATED APPLICATION

This application claims the benefits of provisional application No. 61/759,870, filed on Feb. 1, 2013, which is hereby incorporated by reference in the entirety.

TECHNICAL FIELD

Embodiments of the present disclosure generally relate to wireless communications, and more particularly to a wireless communications system and method that improve coexistence between communication protocols using overlapping frequency bands.

BACKGROUND

As both Bluetooth and WiFi communications technologies operate within the same 2.4 GHz frequency band, interference between data streams using the two protocols can occur. This interference can result in lost data in either or both of the Bluetooth and WiFi channels. In addition, this interference is more likely to occur when a single device employs both communication technologies because two potentially interfering channels may be active in a common spatial area and/or may use a single shared antenna. Moreover, Bluetooth and WiFi may simultaneously transmit data as the protocols are sometimes operated in an independent manner by different applications of a wireless device. However, interference may also occur between multiple wireless devices that are not communicating with each other.

There are several example scenarios when Bluetooth and WiFi might coexist. In one example, a mobile device may be connected to a wireless local area network (WLAN) using WiFi and a wireless headset using Bluetooth. In this example, a user may be operating a mobile device to establish a voice over Internet protocol (VoIP) call using WiFi while also using a Bluetooth headset. In another example, a group of users may be playing a real-time game using WiFi as a game data transport, while a subset of those users are listening to game audio using a Bluetooth connected headset.

As the use of wireless technologies continues to increase, the potential for problems caused by interference will also increase. Accordingly, there remains a need to reduce or prevent the occurrence of interference when both Bluetooth and WiFi are present.

DETAILED DESCRIPTION

Embodiments of the present disclosure are directed to an improved system and method for reducing interference between communication protocols using overlapping frequency bands, such as WiFi and Bluetooth. In an example embodiment, a first wireless device may receive a message from a second wireless device identifying communication requirements of a point-to-point communication involving the second wireless device. The first wireless device may determine whether the second wireless device's communication requirements can be satisfied based on communication resources already committed for other communications. When the communication requirements of the second wireless device can be satisfied, the first wireless device may generate a time sharing schedule to be used by the first and second wireless devices based on the already-committed communication requirements and the second device's communication requirements. The time sharing schedule may include a first portion for broadcast communication among a group of devices to which the first and second wireless devices belong, and a second portion for point-to-point communications of the second wireless devices.

Throughout the description that follows, reference is made to a wireless device, as an example embodiment. It should be understood that the embodiments may be adapted to portable (e.g., a mobile phone or tablet) and stationary (e.g., desktop or game device) wireless communication devices alike. It should also be understood that the communication techniques and associated methods may be applied to a wide variety of electronic devices, such as mobile phones, tablets, laptops, desktops, Internet-enabled televisions, wireless networking devices (e.g., a router), game terminals, and the like which may include one or more accessory devices, such as wireless headsets, speakers, keyboards, and/or mice connected by a short range communication protocol (e.g., Bluetooth).

Figure 1:
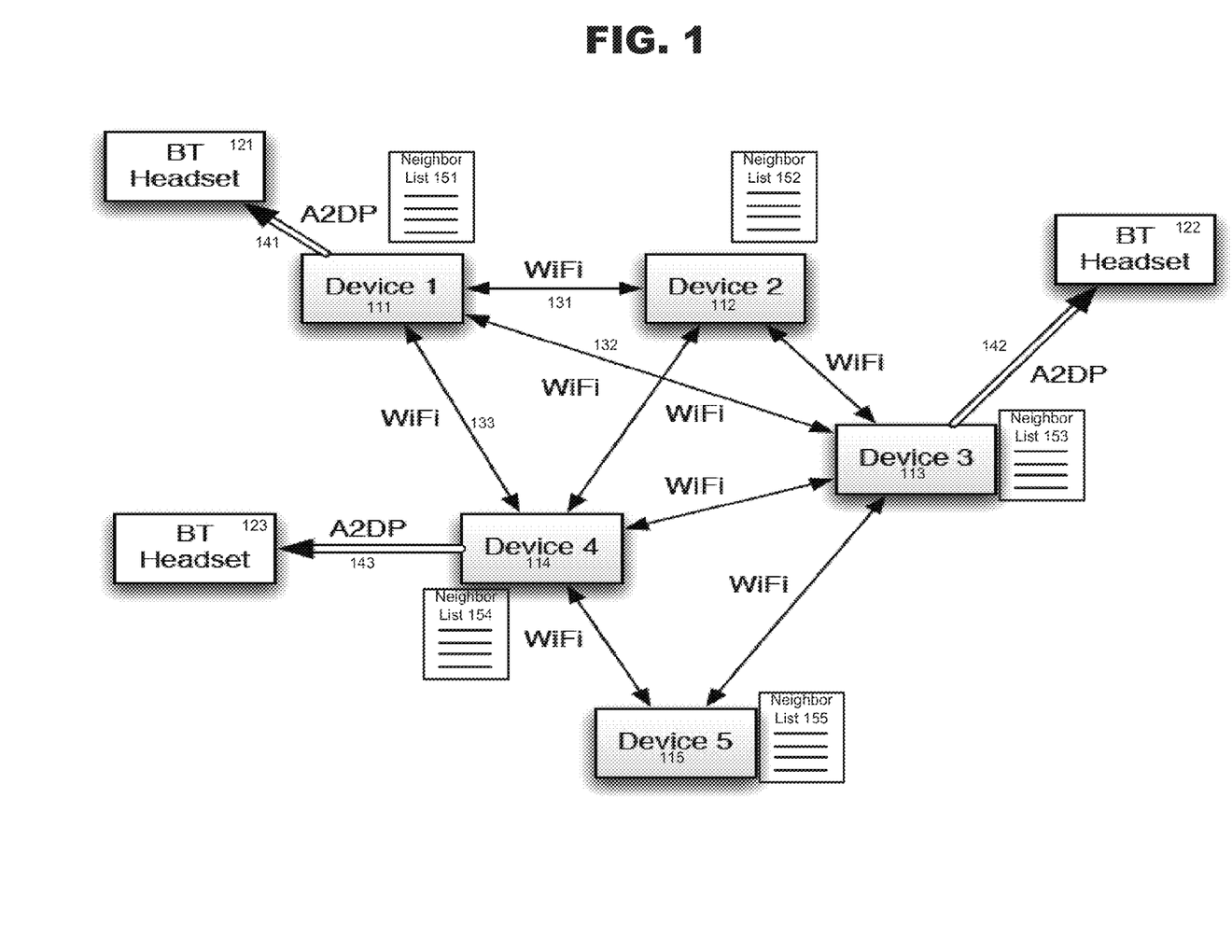
FIG. 1 illustrates a peer-to-peer communications network according to an example embodiment.

FIG. 1 illustrates a peer-to-peer communications network 100 according to an example embodiment. The network 100 may include a plurality of wireless devices 111-115 and a plurality of accessory devices 121-123. Collectively, the plurality of wireless devices 111-115 engaged in peer-to-peer communications may be referred to as a "group." For the purposes of the present discussion, a "group" of wireless devices simply refers to two or more devices that are actively engaged in peer-to-peer communication. In addition, the wireless devices may be compliant with one or more wireless communication protocols, such as Bluetooth and WiFi protocols (e.g., IEEE 802.11a, 802.11b, 802.11g, 802.11n and 802.11ac). In some embodiments, the wireless devices may also be adapted to support proprietary peer-to-peer protocols such as Apple Wireless Direct Link (AWDL). Other similar protocols also may be adopted in order to engage in peer-to-peer communications.

In the example communications network 100 illustrated in FIG. 1, a plurality of wireless devices 111-115 are connected, in an "ad-hoc" or "peer-to-peer" arrangement, via WiFi, and may be exchanging data in a full or partial mesh configuration. For example, wireless device 111 may be connected to wireless devices 112, 113, and 114 through a series of peer-to-peer communication links 131, 132, and 133. Although not shown, wireless device 111 also may be coupled to wireless device 115, if desired.

In addition, one or more of the wireless devices 111-115 also may be connected to a respective accessory device 121-123 via a short-range communication link. An accessory device 121-123 may be a headset, speaker, keyboard, display, mouse or any other peripheral device connected by a short-range wireless link, such as Bluetooth. In the example network configuration of FIG. 1, each of wireless devices 111, 113, and 114 may be coupled to a respective accessory device 121, 122, and 123 via short-range communication links 141, 142, and 143, respectively. Communication links 141, 142, and 143 may be Bluetooth channels operable to transmit and receive several types of data, such as text, voice, multi-media streams, and the like. Bluetooth communication channels, such as link 141, may be formed between a wireless device and an accessory device through a scanning and discovery process that establishes a connection between the two devices. Thus, a wireless device may simultaneously maintain short-range communication links with an accessory device as well as peer-to-peer communication links with another group device.

Each of the wireless devices within the communications network 100 also may store and maintain a neighbor list 151-155. Within a neighbor list, each wireless device 111-115 may identify and store data identifying of other group wireless devices with which it is already engaged in peer-to-peer communication. Several data entries may be associated with each of the listed group devices. For example, the listing may include a device identifier, device address, associated accessory device identifier, and communications requirements for each of listed group devices. In some instances, a neighbor list may also include information of its host wireless device such that a complete listing of the group may be obtained by sharing the neighbor list between wireless devices.

The neighbor lists 151-155 may be populated in a variety of ways. For example, information about other devices may be obtained through a scanning and discovery process. In another example, wireless devices 111-115 may exchange list information with each other when a group is formed. In yet another example, the neighbor lists may be generated through a sequential process. In an example sequential process, a neighbor list may be initially generated when two wireless devices form a group, and entries may be added or removed when a device joins or leaves the group. In this example, the initiating wireless device and its list information may be listed first, and each subsequent group device may be listed thereafter in the order that it joins the group. In addition, the neighbor list may be updated when the communication requirements of one of the group devices increases or changes.

As will be described below, neighbor lists 151-155 may be used to generate a time sharing schedule that may be adopted by each of wireless devices 111-115. More specifically, each wireless device 111-115 may generate a time sharing schedule according to a predetermined algorithm or shared common protocol. At each wireless device, the shared common protocol may be executed, using information contained within its neighbor list, to generate a time sharing schedule. Because each wireless device operates using the same input data, such as data requirements for each group device, the shared common protocol may generate the same time sharing schedule at each wireless device 111-115, without the need for a centralized administrator that establishes a schedule for other devices within a group.

As discussed above, the described embodiments may be adapted by portable and/or stationary wireless communication devices. Such devices include mobile phones, tablets, laptops, desktops, Internet-enabled televisions, wireless networking devices (e.g., a router), game terminals, and the like which may include one or more accessory devices, such as wireless headsets, speakers, keyboards, and/or mice connected by a short range communication protocol (e.g., Bluetooth).

Thus, a plurality of wireless devices may communicate with one another in a peer-to-peer arrangement via a wireless communication protocol, such as WiFi, and may communicate with accessory devices via a short-range communication protocol, such as Bluetooth. An example use of communication network 100 is a group of users playing in a real-time game using WiFi as the game data transport, while a subset of those users are listening to the game audio using a Bluetooth headset or speaker.

Figure 2:
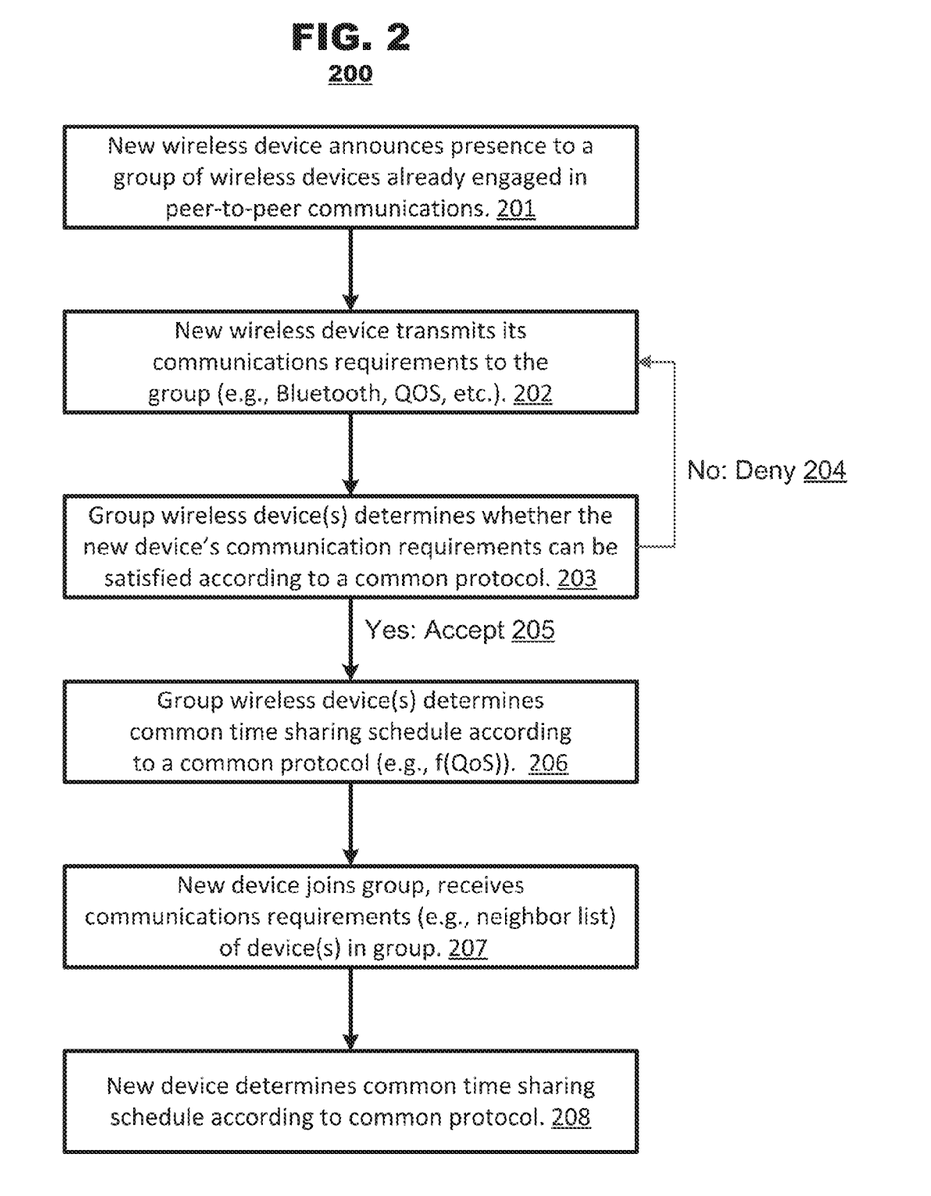
FIG. 2 illustrates a method for joining a peer-to-peer communications group according to an example embodiment.

FIG. 2 illustrates a method 200 for joining a peer-to-peer communications group according to an example embodiment. The method 200 may be used by a wireless device in an environment where other wireless devices may be active and using disparate, but potentially interfering communication protocols. The method 200 permits the wireless devices to coordinate transmissions such that interference between them can be minimized.

As depicted in FIG. 2, a new wireless device may send a join request message to announce its presence to an already-formed group of wireless devices engaged in peer-to-peer communications at 201. In some instances, a wireless device may announce its presence to another wireless device to engage in peer-to-peer communications, and a group may be formed between the two devices.

When the new wireless device broadcasts a join request, the new wireless device is not yet synchronized with other wireless devices. Moreover, the new wireless device may also determine whether a group has already been formed. Here, the new wireless device may locate nearby wireless devices through a conventional scanning process. As will be discussed in connection with FIG. 3, nearby wireless devices may transmit an acknowledgment message in reply to a new wireless device's join request. The acknowledgment message may also include a flag to indicate whether the replying wireless device is part of a group. As some group devices may be within range and other group devices may be out of range of the new wireless device, nearby wireless devices may also transmit a copy of their respective neighbor lists containing a listing of all group devices. Receipt of a neighbor list from one or more nearby wireless devices also indicates that a group has already been formed.

Referring back to FIG. 2, the new wireless device may transmit its communications requirements (e.g., Bluetooth, QoS, etc.) to one or more wireless devices in the peer-to-peer group (box 202). The new wireless device may transmit its communications requirements to each member of the peer-to-peer group. For example, the new wireless device may provide its estimated data needs to other wireless devices so that a determination can be made, by wireless devices already engaged in peer-to-peer communications, as to whether the data needs of the new wireless device can be satisfied within the group.

A wireless device may estimate its communication requirements in a variety of ways. In a simple implementation, the wireless device may execute one or more applications that have predetermined requirements for communication throughput. Alternatively, the wireless device may derive its communication requirements from the type(s) of data to be exchanged via a wireless channel, for example, video data, audio data or controller data, each of which may have their own requirements for data throughput and quality of service. Moreover, the wireless device may estimate its requirements from other indicators, for example, historical requirements and environmental characteristics such as received signal strength of transmissions received from the other wireless devices and estimates of ambient noise.

The wireless device may perform separate estimates to define requirements of peer-to-peer communications with the other wireless devices and also to define requirements of communications with its paired accessory device. For example, a wireless device may use a standard advanced audio distribution profile (A2DP) to stream audio to a Bluetooth headset. In this example, a wireless devices may, using WiFi or AWDL multicast frame(s), notify group devices about the presence of the A2DP stream as well as the desired transmission period (i.e., the amount of time that their A2DP stream requires to operate properly, this time will depend on BT audio encoding, BT interferences, signal strength, etc.).

At 203, wireless device(s) that receive the new device's transmissions and are already engaged in peer-to-peer communications, may determine whether the new wireless device's communication requirements can be satisfied. In some instances, each group wireless device can make this determination according to a shared common protocol. When the new device's requirements cannot be achieved, the new wireless device's request to join the group may be denied (branch 204). However, the new wireless device may be permitted to retry at a later time.

Otherwise, when the new wireless device's requirements can be satisfied, the new device may be accepted into the group (branch 205). Each of the group devices may generate a new time sharing schedule according to a shared common protocol (at box 206). As will be described below, the common time sharing schedule may include multiple portions, such as a first portion for broadcast communication among the group devices, a second portion for the point-to-point communications, and a third portion for Bluetooth communications. An example common time sharing schedule may include three time portion including WiFi unicast/multicast, WiFi unicast, and Bluetooth transmission portions.

Next, at 207, the new wireless device may join the peer-to-peer group. Here, the new device may receive data representing communications requirements of the other wireless device(s) already in a group. A new device may receive such data from each group device individually, or from one group member representing the whole group. For example, the new wireless device may receive multiple transmissions and assemble the communications requirements data contained in each message to generate a neighbor list. Alternatively, at least one of the group devices may transmit its neighbor list, including communication requirements for each group device, to the new device. These communications requirements enable the new wireless device to determine the common time sharing schedule according to a shared common protocol. Regardless of the technique used to generate a neighbor list, the communication requirements of multiple group wireless devices may be stored within a neighbor list.

Lastly, at step 208, the new wireless device determines the common time sharing duty cycle according to the common protocol. Accordingly, each group wireless device, including the new wireless device, determines a common time sharing schedule according to a common protocol. And thus, the new wireless device joins the peer-to-peer group.

Figure 3:
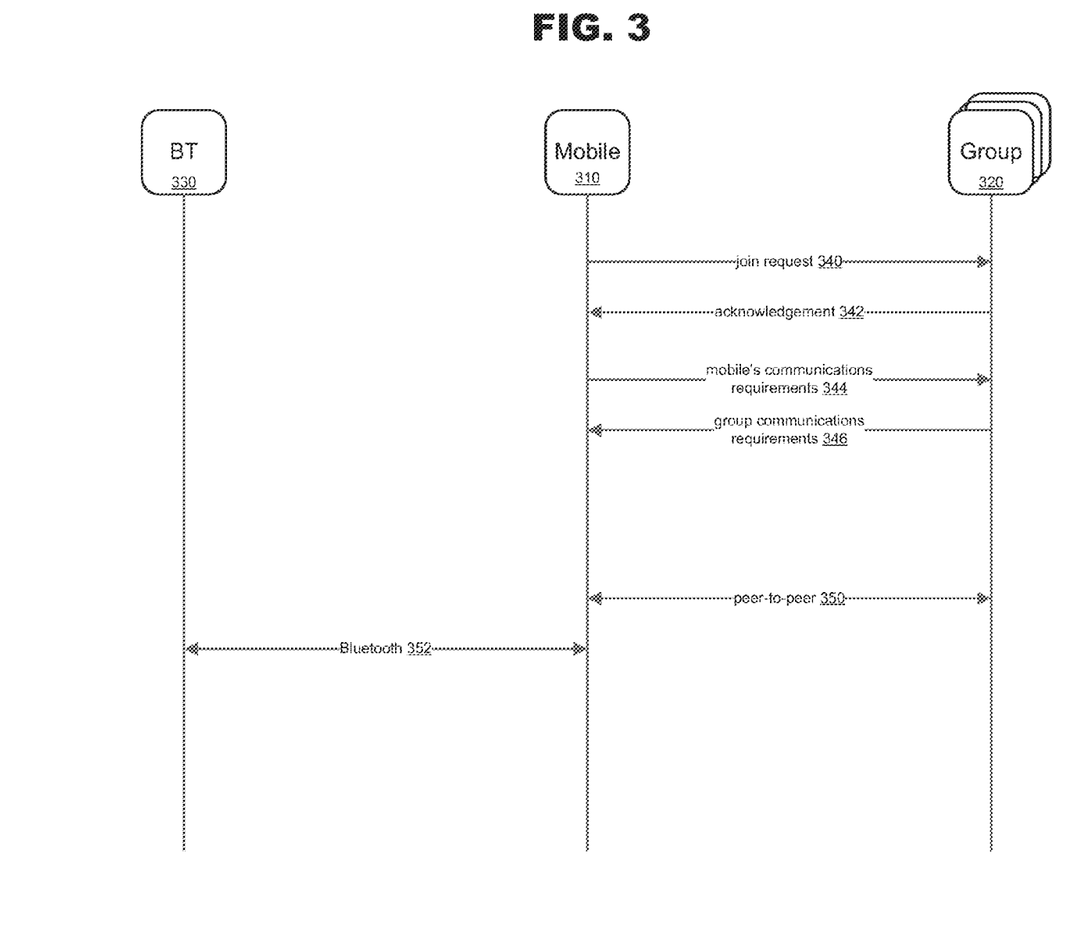
FIG. 3 illustrates a signal flow diagram for joining a peer-to-peer communications group according to an example embodiment.

FIG. 3 illustrates a signal flow diagram for joining a peer-to-peer communications group according to an example embodiment. FIG. 3 illustrates communications among a new wireless device 310, a group 320 of other wireless devices that already are active and an accessory device 330 to be paired with the new wireless device 310.

As shown in FIG. 3, the new wireless device 310 may send a join request 340 to announce its presence to a group 320 of wireless devices already engaged in peer-to-peer communications. Each group device 320 may send an acknowledgment message 342 to the new wireless device 310, acknowledging receipt of the join request message 340. Alternatively, or in addition, one or more of the group devices 320 may also send its neighbor list to new wireless device 310. Next, as explained above, the new wireless device 310 transmits its communications requirements 344 to each of the group devices 320. If the new wireless device's 310 estimated data needs can be satisfied, the new device 310 receives message(s) representing communication requirements of group device(s) (shown as a single transmission 346 in FIG. 3). At this stage, each wireless device, including the newly added wireless device 310, may determine a new common time sharing schedule according to a common protocol and new peer-to-peer communications session 350 is established.

After the method of joining a peer-to-peer communications group, as illustrated in FIGS. 2 and 3, is completed, each group wireless device is allocated communication channels for peer-to-peer communications with other wireless devices, and communication channels to communicate with an accessory device, as needed. The new wireless device 310 may communicate with other devices of the group 320 according to its allocated transmission resource from the common time sharing schedule (shown as transmission 350) and may communicate with its paired accessory device 330 according to another allocated transmission resource (shown as transmission 352).

Figure 4:
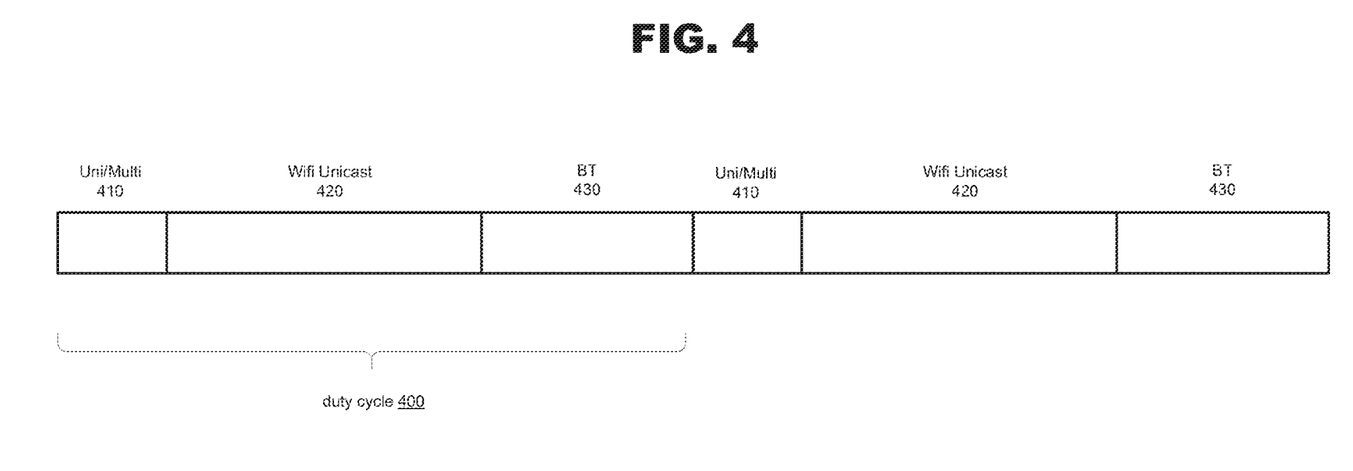
FIG. 4 illustrates a common time sharing schedule used by a peer-to-peer communications network according to an example embodiment.

FIG. 4 illustrates a common time sharing schedule 400 used by a peer-to-peer communications network according to an example embodiment. The common time sharing schedule 400 may include multiple transmission portions, such as a first portion 410 for broadcast communication among the group devices, a second portion 420 for point-to-point communications, and a third portion 430 for communication with an accessory device, such as a Bluetooth device.

An example time sharing schedule or "duty cycle" will now be described. At the outset of the example time sharing schedule, the first portion 410 may include a WiFi broadcast portion during which both unicast and/or multicast WiFi frames can be transmitted. The duration of the broadcast portion can be fixed and/or negotiated between the group wireless devices. In some instances, the first portion may have a fixed and predetermined duration. Alternatively, the duration of the first portion may be determined by a shared common protocol. As its name implies, WiFi multicast frames may be sent during the broadcast or first portion.

According to an embodiment, unicast transmissions may also be transmitted during the broadcast portion.

Next, during the second portion 420, the wireless device can transmit and/or receive in WiFi unicast frames. The duration of this portion may be specified on a per device basis. For example, this portion may vary for each wireless device within the group of peer-to-peer devices. Lastly, during a third portion 430, short range wireless signals may be exchanged between a wireless device and an associated accessory device. The duration of the third portion period may be equal to the remainder of the common time sharing schedule length. Accordingly, the duration of the third portion 430 may also vary on a per device basis.

Within the first and second portions 410 and 420, each group device may be assigned one or more time slots. For example, wireless devices may be assigned timeslots according to the order of wireless devices in the neighbor list. Referring back to the sequential neighbor list, the initiating wireless device may be listed first and may be assigned a first time slot, and each subsequent group device may be assigned a time slot in the order that it joins the group.

During establishment of the group, wireless devices may negotiate the length of the common time sharing schedule as well as the length of the WiFi multicast unicast portion, during which Bluetooth communications are not permitted. The time sharing schedule can be negotiated and synchronized using out of band signaling, and thus no WiFi frames are needed to mark the start and end of every portion.

The duration of the third portion, or Bluetooth portion, at a given wireless device may vary dynamically, but it is expected to change fairly infrequently as compared to the rate at which devices in a group refresh their communication needs (because it varies only as a reaction to modifications of the surrounding environment, and does not vary on a per packets basis). Adjustments should typically not occur with periods faster than 10 seconds or a minute. Hence, a device can adjust the length of its Bluetooth portion and notify its peer devices of that adjustment.

Use of the common time sharing schedule allows device to safely exchange multicast frames and avoid collision between Bluetooth traffic and WiFi multicast traffic. Use of the time sharing schedule also allows devices to throttle their respective unicast WiFi traffic such that it does not overlap with Bluetooth traffic. In addition, WiFi unicast communication between two unpaired (e.g., non-Bluetooth or A2DP) devices is not restricted. In some instances, two or more unpaired devices may forgo having a third portion (e.g., Bluetooth portion).

In order to solve the coexistence problems posed by WiFi and Bluetooth, the WiFi interface can be used to synchronize the participating devices to a common time base such that they may timeshare the transmission medium. Once synchronized, the participating devices can simultaneously stream WiFi data and use Bluetooth A2DP. As each device is synchronized via WiFi (e.g., a synchronization protocol such as AWDL can also be used), group wireless devices are able to operate a common time sharing schedule. In implementing the AWDL protocol, the common time sharing schedule will be synchronized to an AWDL availability window such that the WiFi period starts at the beginning of the availability window and extends for a fixed amount of time, the third portion or Bluetooth A2DP portion follows and continues until the start of the next availability window.

Figure 5:
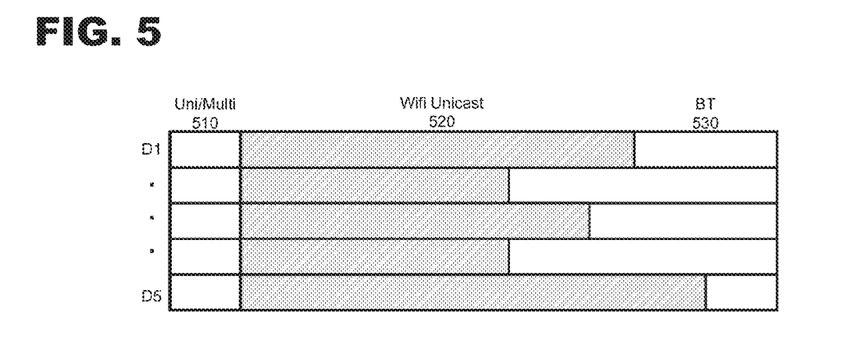
FIG. 5 illustrates a common time sharing schedule for a plurality of devices according to an example embodiment.

FIG. 5 illustrates a common time sharing schedule for a plurality of devices D1-D5 according to an example embodiment. The example common time sharing schedule, depicted in FIG. 5, includes three transmission portions, namely, a first portion or WiFi unicast/multicast transmission portion 510, a second portion or WiFi unicast transmission portion 520, and a third portion or Bluetooth transmission portion 530 are included. In addition, the common time sharing schedule of FIG. 5 illustrates that while the first portion or WiFi unicast multicast period 510 can be fixed among the devices, the remaining second and third portions, i.e. WiFi unicast and Bluetooth portions 520 and 530, can vary between devices. As a result, each wireless device may allocate more or less duration of the duty cycle to communication with a paired accessory device according to its individual needs.

Although data transmitted during portions 520 and 530 may potentially interfere, the use of a common time sharing schedule substantially reduces the likelihood of data loss resulting from interference. As higher priority multicast and unicast transmissions may be transmitted during portion 510, such higher priority transmissions are not subject to possible interference originating from accessory device communications of other group devices.

Figure 6:
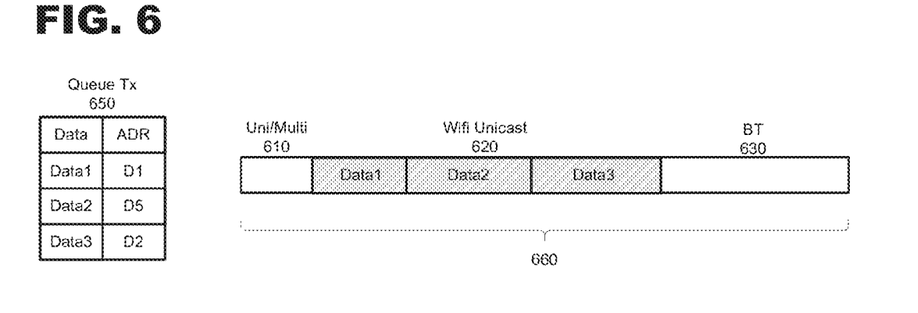
FIG. 6 illustrates a transmission queue and transmission channel for a wireless device according to an example embodiment.

FIG. 6 illustrates a transmission queue and transmission sequence for a wireless device according to an example embodiment. In the example transmission sequence 660, a wireless device, such as device D3, may transmit data from its transmission queue 650 to multiple group devices. In the example depicted in FIG. 6, data blocks Data1, Data2, and Data3 can be queued for transmission to devices D1, D5, and D2 respectively. In this example, data blocks Data1, Data2, and Data3 are transmitted within the WiFi unicast portion 620.

Figure 7:
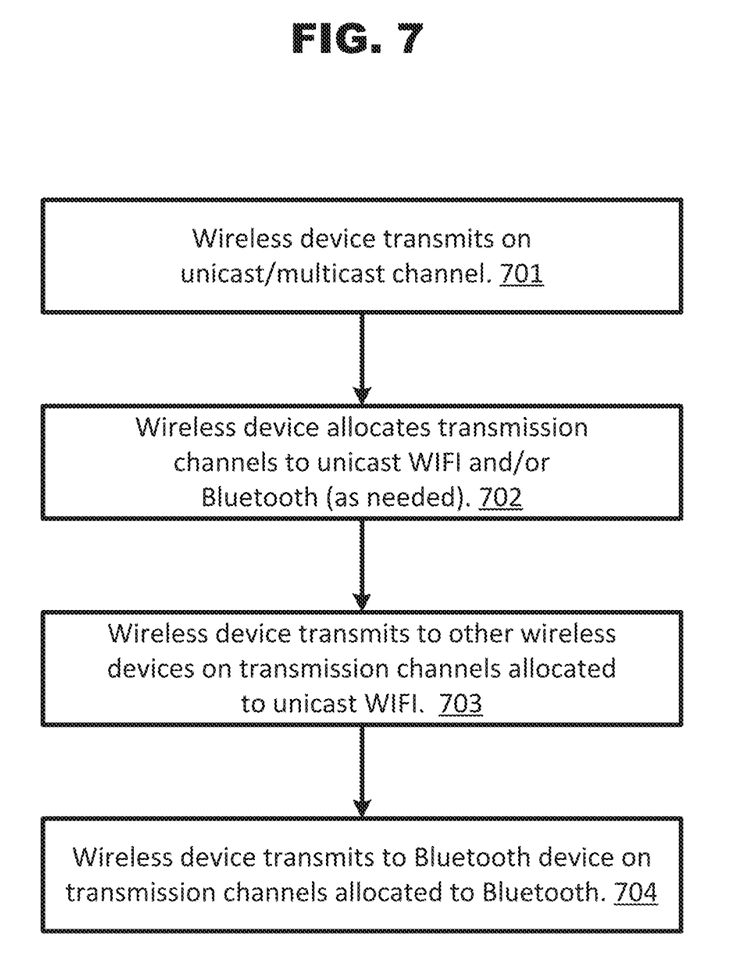
FIG. 7 illustrates a method for communicating using a common time sharing schedule according to an example embodiment.

FIG. 7 illustrates a method for communicating using a common time sharing schedule according to an example embodiment. At 701, a wireless device may transmit on during a first portion on a unicast/multicast channel. At 702, the wireless device may allocate transmission channels to unicast WiFi and/or Bluetooth, as needed. At 703, the wireless device may transmit, during a second portion, to other group wireless devices on transmission channels allocated to unicast WiFi. At 704, the wireless device may transmit to an accompanying device, during a third portion, on transmission channels allocated to Bluetooth. The method 700 may repeat as long as the device is a member of the group (and has data to transmit).

Figure 8:
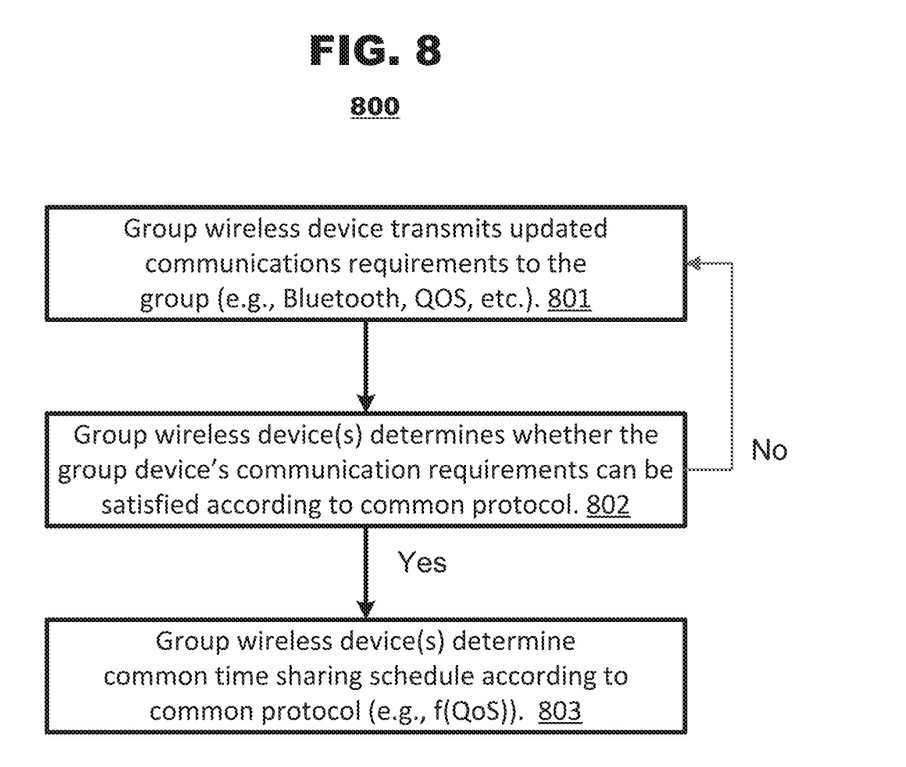
FIG. 8 illustrates a method for updating communication requirements within a peer-to-peer communications group according to an example embodiment.

FIG. 8 illustrates a method 800 for updating communication requirements of a wireless device within a peer-to-peer communications group according to an example embodiment. The method 800 permits group wireless devices to coordinate transmissions based on changed communication requirements. As method 800 may be implemented between group devices, the broadcast or peer-to-peer portions of the common time sharing schedule may be used to transmit requests and replies between group devices.

At 801, the group wireless device may transmit its updated communications requirements (e.g., Bluetooth, QoS, etc.) to one or wireless devices in the peer-to-peer group. In a typical case, the wireless device may transmit its updated communications requirements to each member of the peer-to-peer group. For example, the wireless device may provide its estimated data needs to other wireless devices so that a determination can be made, by other group wireless devices, as to whether the updated data needs of the existing group device can be satisfied within the group. For example, a group device may desire to be paired with one or more accessory devices.

At 802, each group device, i.e., wireless devices already engaged in peer-to-peer communications, may determine whether the updated communication requirements can be satisfied. Each group wireless device can make this determination according to a shared common protocol. When the group device's updated requirements cannot be achieved, the request to accommodate the updated requirements is denied. However, the group device is permitted to remain in the group and to retry at a later time. Otherwise, when the group device's updated communications requirements can be satisfied, each of the group devices generates a new time sharing schedule according to a shared common protocol, at 803.

Figure 9:
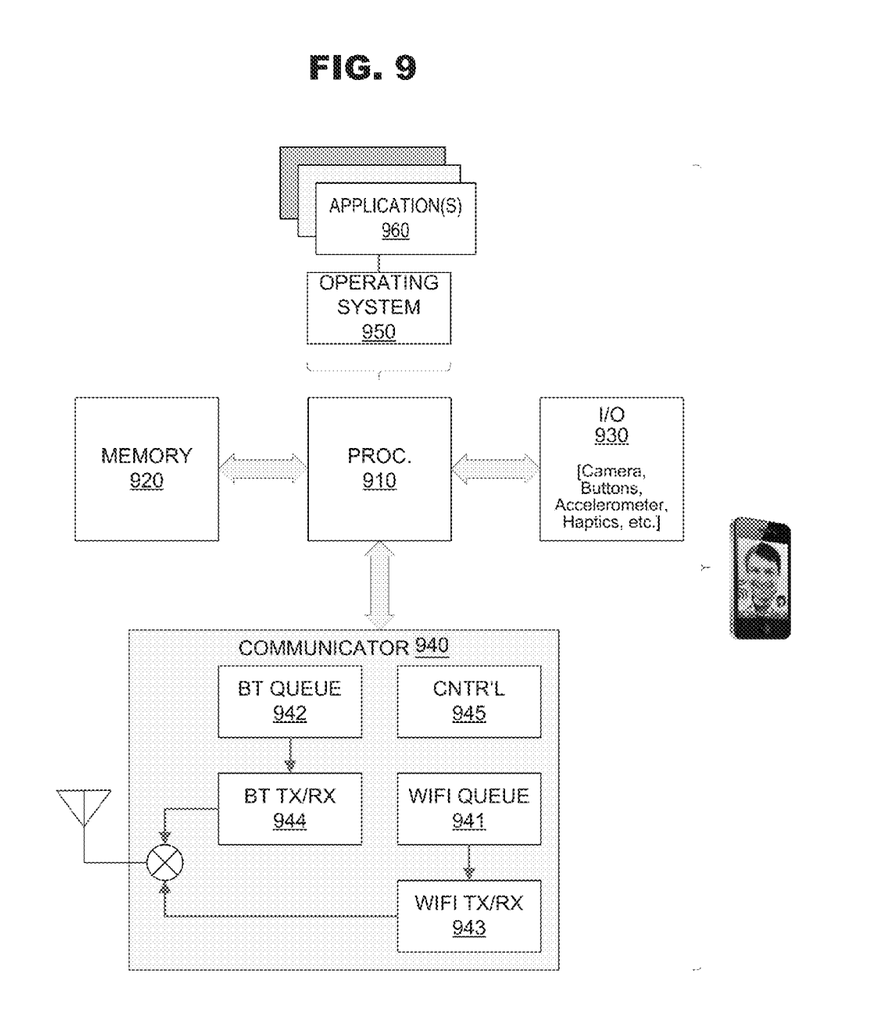
FIG. 9 illustrates a representative architecture of a wireless device according to an example embodiment.

FIG. 9 illustrates a representative architecture of a wireless device according to an example embodiment. A wireless device 900 may include a processing device 910, memory 920, and one or more input/output devices 930 including communicator 940. In addition, the wireless device 900 may also include an operating system 950 that hosts a one or more applications 960.

Within the wireless device 900, processing device 910, memory 920, communicator 940, and input/output devices 930 may be interconnected via a system bus. Communicator 940 may enable connectivity between the applications 960 of the wireless device 900 and peer and accessory devices.

Processing device 910 may execute computation and control functions of the wireless device 900 and comprises a suitable central processing unit (CPU). Processing device 910 may include one or more integrated circuit(s), such as a microprocessing device. Processing device 910 may execute instructions of operating system 950 and/or applications 960 that may be stored within memory 920.

Memory 920 may include a non-transitory machine-readable medium storing modules and instructions of operating system 950 and applications 960. Memory 920 may contain different components for retrieving, presenting, changing, and saving data. Memory 920 may include a variety of memory devices, for example, Dynamic Random Access Memory (DRAM), Static RAM (SRAM), flash memory, cache memory, and other memory devices.

Although not shown, input/output devices 930 may include one or more buttons, cameras, touchscreens, accelerometers, haptic devices, etc. For example, a touchscreen interface may include a display operable to display data to a user and a sensor, such as a capacitive touch detection sensor, configured to detect user inputs by tracking movements on the surface of the touchscreen display.

One or more applications 960 transmit and receive data with other group devices and paired accessory devices through communicator 940. In an example embodiment, communicator 940 may include WLAN (e.g., WiFi or AWDL) and short range transmission queues (e.g., Bluetooth) 941 and 942 that are coupled to WLAN and short range transceivers 943 and 944, respectively. Controller 945 may generate the common time sharing schedule according to a predetermined algorithm. In addition, controller 945 ensures that WLAN and short-range data stored in queues 941 and 942 are transmitted by transceivers 943 and 944 in accordance with the common time sharing schedule.

Applications 960 include one or more software applications designed to be executed on a portable and/or stationary wireless communication device. Such devices include a variety of computer devices such as mobile phones, tablets, laptops, desktops, Internet-enabled televisions, wireless networking devices (e.g., a router), game terminals, and the like. Some example applications include Internet, multimedia, game, and teleconferencing applications.

In some embodiments, the wireless device 900 may include circuitry (not shown) to provide cellular voice and data communications capabilities. For example, the cellular circuitry may be adapted to provide the functionalities of one or more cellular protocols, such as Long Term Evolution (LTE), LTE-Advanced (LTE-A), Universal Mobile Telecommunications System (UMTS), Global System for Mobile Communications (GSM), etc.

The foregoing description has been presented for purposes of illustration and description. It is not exhaustive and does not limit embodiments of the disclosure to the precise forms disclosed. For example, the description refers to WiFi and Bluetooth technologies, but it should be understood that WiFi and Bluetooth are examples, and that the techniques described herein may be applied to other communications technologies. Reference has been made in detail to embodiments, examples of which are illustrated in the accompanying drawings. In the preceding detailed description, numerous specific details are set forth in order to provide a thorough understanding of the present disclosure. However, it will be apparent to one of ordinary skill in the art that the embodiments may be practiced without these specific details. In other instances, well-known methods, procedures, components, and circuits have not been described in detail so as not to unnecessarily obscure aspects of the embodiments.

It will be apparent to those skilled in the art that various modifications and variations can be made in the WiFi real-time streaming and Bluetooth coexistence of the present disclosure without departing from its spirit or scope. Thus, it is intended that the present disclosure cover the modifications and variations that come within the scope of the appended claims and their equivalents.

We claim:

1. A method, comprising:
   at a first wireless device:
      receiving a message from a second wireless device identifying communication requirements of a point-to-point communication involving the second wireless device;
      determining that communication requirements of the second wireless device can be satisfied based on communication resources already committed for other communications; and
      generating a time sharing schedule to be used by the first and second wireless devices based on the already-committed communication requirements and the communication requirements of the second wireless device, the schedule including:
         a first portion for broadcast communication among a group of devices to which the first and second wireless devices belong, and
         a second portion for the point-to-point communication of the second wireless device; and
      transmitting broadcast data during the first portion.

2. The method according to claim 1, wherein the time sharing schedule includes a third portion for Bluetooth communications.

3. The method according to claim 2, wherein the first portion has a fixed duration and the second and third portions have variable durations.

4. The method according to claim 1, further comprising transmitting communication requirements of the first wireless device to the second wireless device.

5. The method according to claim 4, wherein the communication requirements of the first and second wireless device include Bluetooth and quality of service metrics.

6. The method according to claim 1, wherein the determining that the communication requirements of the second wireless device can be satisfied is performed according to a protocol common to the first and second wireless devices.

7. The method according to claim 1, wherein the first wireless device determines the time sharing schedule according to a protocol common to the first and second wireless devices and the communication requirements of the second wireless device.

8. The method according to claim 1, wherein the first wireless device stores a neighbor list including information identifying other devices within a peer-to-peer group as well as their respective address information, communication requirements, and associated Bluetooth devices.

9. The method according to claim 1, wherein the determining that the communication requirements of the second wireless device can be satisfied is performed by each wireless device of a peer-to-peer group.

10. An apparatus of a first wireless device, comprising:
a communicator adapted to receive one or more messages from one or more other wireless devices in a group of wireless devices, the one or more messages identifying communication requirements of a point-to-point communication involving the respective one or more other wireless devices;
a memory adapted to store a neighbor list including information identifying the one or more other wireless devices in the group of wireless devices as well as their respective address information, communication requirements, and associated short range wireless devices; and
a controller adapted to generate a time sharing schedule to be used by the group of wireless devices from the messages, the schedule including:
a first portion for broadcast communication among the group of wireless devices to which the first wireless device and one or more other wireless devices belong, and
a second portion for the respective point-to-point communication of the one or more other wireless devices, wherein the communicator transmits broadcast data during the first portion.

11. The apparatus according to claim 10, wherein the time sharing schedule includes a third portion for Bluetooth communications.

12. The apparatus according to claim 11, wherein the first portion has a fixed duration and the second and third portions have variable durations.

13. The apparatus according to claim 10, wherein the communicator transmits communication requirements to the one or more other wireless devices.

14. The apparatus according to claim 13, wherein the communication requirements include Bluetooth and quality of service metrics.

15. The apparatus according to claim 10, wherein the controller determines whether the communication requirements of the one or more other wireless devices can be satisfied according to a protocol shared with the one or more other wireless devices.

16. The apparatus according to claim 10, wherein the controller determines the time sharing schedule according to a protocol shared with the other wireless devices and the communication requirements of the one or more other wireless devices.

17. A wireless device comprising a non-transitory machine-readable medium storing instructions for:
receiving a message from a second wireless device identifying communication requirements of a point-to-point communication involving the second wireless device;
determining that the communication requirements of the second wireless device can be satisfied based on communication resources already committed for other communications;
generating a time sharing schedule to be used by the wireless device and second wireless device, the schedule including:
a first portion for broadcast communication among a group of devices to which the first and second wireless devices belong, and
a second portion for the point-to-point communication of the second wireless device; and
transmitting broadcast data from the wireless device during the first portion.

18. The wireless device according to claim 17, wherein the time sharing schedule includes a third portion for Bluetooth communications, the first portion having a fixed duration and the second and third portions having variable durations.

19. The wireless device according to claim 17, wherein the time sharing schedule is determined according to a protocol shared with other wireless devices and the communication requirements of the other wireless devices.

* * * * *